United States Patent
Li et al.

(10) Patent No.: US 11,095,914 B2
(45) Date of Patent: Aug. 17, 2021

(54) METHODS AND DEVICES FOR ENCODING AND DECODING USING PARAMETER SETS, AND ELECTRONIC EQUIPMENT

(71) Applicant: ZTE Corporation, Guangdong (CN)

(72) Inventors: Ming Li, Guangdong (CN); Ping Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/939,941

(22) Filed: Jul. 27, 2020

(65) Prior Publication Data
US 2020/0359038 A1    Nov. 12, 2020

Related U.S. Application Data

(60) Continuation of application No. 16/443,847, filed on Jun. 17, 2019, now Pat. No. 10,728,569, which is a division of application No. 14/431,558, filed as application No. PCT/CN2013/082814 on Sep. 2, 2013, now abandoned.

(51) Int. Cl.
| | | |
|---|---|---|
| *H04N 7/12* | (2006.01) | |
| *H04N 19/46* | (2014.01) | |
| *H04N 19/70* | (2014.01) | |
| *H04N 19/597* | (2014.01) | |
| *H04N 19/127* | (2014.01) | |
| *H04N 19/507* | (2014.01) | |
| *H04N 19/174* | (2014.01) | |

(52) U.S. Cl.
CPC .......... *H04N 19/46* (2014.11); *H04N 19/127* (2014.11); *H04N 19/174* (2014.11); *H04N 19/507* (2014.11); *H04N 19/597* (2014.11); *H04N 19/70* (2014.11)

(58) Field of Classification Search
CPC ..... H04N 19/70; H04N 19/127; H04N 19/507
See application file for complete search history.

(56) References Cited

U.S. PATENT DOCUMENTS

2020/0359038 A1* 11/2020 Li ........................ H04N 19/46

* cited by examiner

*Primary Examiner* — Y Lee
(74) *Attorney, Agent, or Firm* — Perkins Coie LLP

(57) ABSTRACT

Provided are methods and devices for encoding and decoding using parameter sets, and electronic equipment. In the method for encoding, an encoder determines parameter sets and/or virtual parameter sets for a slice, wherein the virtual parameter set is a data structure which is generated by loading information acquired from a bitstream into a syntax structure of an existing parameter set and/or a preset syntax structure and includes tool parameters and/or control parameters; and the encoder writes identification number (ID) (s) of the parameter sets and/or virtual parameter sets into a bitstream. Using the method, encoding and decoding efficiency is improved.

11 Claims, 10 Drawing Sheets

METHODS AND DEVICES FOR ENCODING AND DECODING USING PARAMETER SETS, AND ELECTRONIC EQUIPMENT

CROSS REFERENCE TO RELATED APPLICATIONS

This patent document is a continuation of and claims the benefit of priority to U.S. patent application Ser. No. 16/443,847, filed on Jun. 17, 2019, which is a divisional of U.S. patent application Ser. No. 14/431,558, filed on Apr. 28, 2015, which is a U.S. National Phase under 35 U.S.C. § 371 of International Patent Application No. PCT/CN2013/082814, filed on Sep. 2, 2013, which claims the benefit of priority of Chinese Patent Application No. 201210363925.3, filed on Sep. 26, 2012. The entire contents of the before-mentioned patent applications are incorporated by reference as part of the disclosure of this application.

TECHNICAL FIELD

The disclosure relates to the field of communication, in particular to methods and devices for encoding and decoding using parameter sets, and electronic equipment.

BACKGROUND

In H.264/Advanced Video Coding (AVC) compatible Three-Dimensional Video (3DV) coding standard 3D-AVC (AVC compatible video with depth information) which is an active standardization project at present, Depth-Range-based Weighted Prediction (DRWP) and View Synthesis Prediction (VSP) encoding and decoding processes require the use of Depth Parameters (DPs), including maximum depth (marked as "ZFar"), minimum depth (marked as "ZNear"), camera parameters (such as a focal distance) and the like, which are used in a depth map generation process. At present, 3D-AVC encodes and transmits DPs in a subset Sequence Parameter Set (subset SPS or sub-SPS, which is a type of parameter set) and a Depth Parameter Set (DPS) respectively.

3D-AVC determines whether the DPs in the sub-SPS or the DPS are to be used by judging whether the value of syntax element dps_id in Slice Header (SH) is equal to "0" or not. The decoding process is described as follows.

In the decoding process, a decoder parses control parameters in the SH. If the DRWP and/or VSP is used by the decoding process, the decoder further parses a field corresponding to the syntax element dps_id in the SH. If the value of the dps_id is equal to 0, the decoder uses the DPs in the sub-SPS; while if the value of the dps_id is more than 0, the decoder activates the DPS with its identification number (ID) value equal to dps_id following parameter set activation process, and the DPs in this activated DPS are used in the decoding process.

Corresponding to the decoding process, the encoding process is as follows.

In the encoding process, when DPs are used, an encoder writes an ID of the DPS into the field corresponding to the dps_id in the SH. If the DPs in the sub-SPS are used, value "0" is written into the field corresponding to the syntax element dps_id of the SH; while if the DPs in a certain DPS are used, an ID value of this DPS is written into the field corresponding to the syntax element dps_id of the SH, and this ID value is equal to the value of the syntax element depth parameter set id in this DPS.

In order to improve the encoding efficiency, predictive encoding may further be used for the DPs in the DPS, and a prediction mode and prediction reference information may be encoded in the DPS. The prediction reference may be the DPs in another DPS, and may also be the DPs in a sub-SPS. Therefore, 3D-AVC stores the DPs decoded from DPS in an array and employs dps_id as the index parameter for accessing the array, and permanently employs an array element corresponding to an index parameter "0" as a storage location for the DPs in the sub-SPS. In this way, 3D-AVC identifies the prediction reference of the DPs in the DPS directly by the index parameter of the DPs in the array.

Another possible implementation mode different from the SH of 3D-AVC is as follows: an independent flag is added to identify whether the DPs used for a slice decoding process are from the sub-SPS or not, instead of judging whether the DPs in the sub-SPS or the DPS are to be used by judging whether the dps_id is 0 or not. When the DPs in the sub-SPS are not used, the DPS with its ID value equal to dps_id is activated, and current slice is decoded using the DPs in the activated DPS. The method is not included in 3D-AVC because an additional flag and its corresponding decoding operations are required to be added.

Main defects of the conventional method used by 3D-AVC are inconsistency with general operations of a parameter set, which introduces additional judgment and special condition processing flows in an implementation flow. Main limitations of the conventional method are as follows.

First, the operations related to SPS/sub-SPS in the decoding process are inconsistent with general processing flows of the parameter set. "Setting data included in the parameter set to be data actually used in the decoding process immediately after the parameter set is activated" is one of general flows of the parameter set. In slice decoding process, the decoder activates the sub-SPS at first. For a slice using the DPs, the decoder can determine to update information in a storage element corresponding to the index parameter "0" in the array storing DP data, but cannot determine whether to use DP information of the activated sub-SPS or not in a subsequent decoding process of the slice after activating the sub-SPS, since it has to wait for DRWP and/or VSP flags and dps_id information.

Second, as mentioned above, the decoder cannot determine the validity range of the DPs included in the sub-SPS in the decoding process, namely whether the DPs included in the sub-SPS are applicable to the entire decoding process or only used for updating the array storing the DP data, immediately after the sub-SPS is activated.

Third, the DPS operations in the decoding process are inconsistent with the general processing flows of the parameter set. "That the decoder activates the parameter set with its ID equal to the value of the corresponding syntax element in the SH and simultaneously sets a previously activated parameter set with a different ID value into an inactive state" is also one of the general flows of the parameter set. In the slice decoding process, the condition that the value of dps_id is "0" is required to be specially processed, that is, the information in the storage element corresponding to the index parameter "0" in the array storing the DP data is assigned to a variable corresponding to the DP in a current slice decoding process, and a special condition processing flow of the decoder is added.

For the problem of relatively complex flows of methods for encoding/decoding using parameter sets in a related art, there is yet no effective solution.

SUMMARY OF THE DISCLOSURE

For the problem of relatively complex flows of methods for encoding/decoding using parameter sets in the related art, the embodiments of the disclosure provide methods and devices for encoding and decoding using parameter sets, and electronic equipment, so as to at least solve the problem.

According to one embodiment of the disclosure, a method for encoding using parameter sets is provided, which includes: an encoder determines parameter sets and/or virtual parameter sets for a slice, wherein the virtual parameter set is a data structure which is generated by loading information acquired from a bitstream into a syntax structure of an existing parameter set and/or a preset syntax structure and includes tool parameters and/or control parameters; and the encoder writes IDs of the parameter sets and/or virtual parameter sets into a bitstream.

In an example embodiment, the step that the encoder determines the parameter sets and/or virtual parameter sets for the slice includes: the encoder judges whether at least one of following conditions meets or not: tool parameters and/or control parameters for encoding current slice are the same as tool parameters and/or control parameters of the existing parameter set, the tool parameters and/or control parameters for encoding the current slice are the same as tool parameters and/or control parameters in an existing virtual parameter set; if a judgment result is positive, the encoder determines the existing parameter set with the same tool parameters and/or control parameters as the parameter set for the slice, and/or determines the existing virtual parameter set with the same tool parameters and/or control parameters as the virtual parameter set for the slice; and if the judgment result is negative, the encoder employs a generated parameter set as the parameter set for the slice, and/or employs a constructed virtual parameter set as the virtual parameter set for the slice.

In an example embodiment, the step that the encoder writes the IDs of the parameter sets and/or virtual parameter sets into the bitstream includes: the encoder writes an ID of the parameter set with the same tool parameters and/or control parameters and/or an ID of the virtual parameter set with the same tool parameters and/or control parameters into one of the following bitstreams: an SH bitstream, a bitstream employing the parameter set with the same tool parameters and/or control parameters and/or a bitstream employing the virtual parameter set with the same tool parameters and/or control parameters.

In an example embodiment, the step that the encoder writes the IDs of the parameter sets and/or virtual parameter sets into the bitstream includes: when the encoder identifies that the tool parameters and/or control parameters for the current encoding slice are partially but not completely the same as the tool parameters and/or control parameters of the parameter set, the encoder sets a value of a syntax element corresponding to the ID of the parameter set in an SH of the current encoding slice as a first preset value, and writes the first preset value into the bitstream using an entropy coding method; and/or the encoder sets a value of a syntax element corresponding to a parameter set ID in the parameter set including the tool parameters and/or the control parameters as a second preset value, and writes the second preset value into the bitstream using the entropy coding method; when the encoder identifies that the tool parameters and/or control parameters for the current encoding slice are completely different from the tool parameters and/or control parameters of the parameter set, the encoder generates a parameter set including the tool parameters and/or control parameters for the current encoding slice; an ID is allocated to the parameter set for the current encoding slice; and the value of the syntax element corresponding to the ID of the parameter set in the SH of the current encoding slice is set to be the ID of the generated parameter set, and the ID of the generated parameter set is written into the bitstream using the entropy coding method.

In an example embodiment, the step that the encoder determines the parameter sets and/or virtual parameter sets for the slice includes: the encoder judges whether the tool parameters and/or control parameters for the current encoding slice are partially but not completely the same as the tool parameters and/or control parameters in the parameter sets or not, and a virtual parameter set with tool parameters and/or control parameters completely the same as the tool parameters and/or control parameters for the current encoding slice is able to be constructed or not; if a judgment result is positive, the encoder constructs a virtual parameter set by loading data in the existing parameter sets as the virtual parameter set for the slice, and determines the ID of the virtual parameter set for the slice; and if the judgment result is negative, the encoder generates a parameter set including the tool parameters and/or the control parameters, and allocates an ID to the generated parameter set.

In an example embodiment, the step that the encoder writes the IDs of the parameter sets and/or virtual parameter sets into the bitstream includes: the encoder sets the value of the syntax element corresponding to the parameter set ID in the SH of the current encoding slice as the ID of the generated virtual parameter set, and writes the value into the bitstream using an entropy coding method; and/or the encoder sets the value of the syntax element corresponding to the parameter set ID in the parameter set including the tool parameters and/or the control parameters as the ID of the virtual parameter set, and writes the ID of the generated virtual parameter set into the bitstream using the entropy coding method; or the encoder sets the value of the syntax element corresponding to the parameter set ID in the SH of the current encoding slice as the ID of the generated parameter set, and writes the ID of the generated parameter set into the bitstream using the entropy coding method.

In an example embodiment, the tool parameters and/or the control parameters are depth information parameters, and the tool parameters and/or the control parameters include at least one of: parameters for a digital presentation of depth information, attribute parameters for camera imaging system and camera arrangement manner related parameters.

According to another embodiment of the disclosure, a method for decoding using parameter sets is provided, which includes: a decoder generates virtual parameter sets, wherein the virtual parameter set is a data structure which is generated by loading information acquired from a bitstream into a data element structure of an existing parameter set and/or a preset data element structure and includes tool parameters and/or control parameters; the decoder allocates an identification number (ID) to the virtual parameter set; and the decoder activates the virtual parameter set according to the ID of the virtual parameter set, and configures tool parameters and/or control parameters for slice decoding process according to parameters in the virtual parameter set.

In an example embodiment, before the decoder generates the virtual parameter set, the method further includes: the decoder determines that one or more types of preset tool parameters and/or control parameters are able to be acquired from one or more independent elements in the bitstream.

In an example embodiment, before the decoder generates the virtual parameter set, the method further includes: the decoder acquires IDs of parameter sets directly and/or indirectly referred to by a slice from the bitstream; and the decoder determines that the ID values of the parameter sets directly and/or indirectly referred to by the slice are out of a preset value range.

In an example embodiment, the step that the decoder generates the virtual parameter set includes: the decoder generates the virtual parameter set by loading information acquired from one or more independent elements of the bitstream into a syntax structure of the existing parameter set or a preset syntax structure, wherein the virtual parameter set includes all and/or a part of information included in the one or more independent elements in the bitstream.

In an example embodiment, the step that the decoder generates the virtual parameter set by loading the information acquired from one or more independent elements of the bitstream into the syntax structure of the existing parameter set or the preset syntax structure includes: the decoder decomposes the ID of the parameter set directly or indirectly referred to by the slice into index numbers of the one or more independent elements for constructing the virtual parameter set according to the ID of the parameter set directly or indirectly referred to by the slice; and the decoder acquires the information from the one or more independent elements in the bitstream according to the index numbers of the one or more independent elements, and generates the virtual parameter set according to the syntax structure of the existing parameter set or the preset syntax structure.

In an example embodiment, the step that the decoder acquires the information from the one or more independent elements in the bitstream according to the obtained index numbers of the independent elements, and generates the virtual parameter set according to the syntax structure of the existing parameter set or the preset syntax structure includes: the decoder constructs the virtual parameter set by using all or a part of tool parameters and/or control parameters included in one or more front independent elements according to the parsing order of the index numbers of multiple independent elements.

In an example embodiment, the index numbers of the independent elements are IDs of existing parameter sets.

In an example embodiment, the independent elements in the bitstream are data elements divided by delimiters periodically appearing in the bitstream.

In an example embodiment, the data elements are Network Abstraction Layer (NAL) units.

In an example embodiment, the step that the decoder allocates the ID to the virtual parameter set includes: the decoder allocates an ID reserved for the virtual parameter set to the virtual parameter set.

In an example embodiment, the step that the decoder allocates the ID reserved for the virtual parameter set to the virtual parameter set includes: the decoder allocates a reserved fixed numerical value to the virtual parameter set as the ID of the virtual parameter set.

In an example embodiment, the step that the decoder allocates the ID to the virtual parameter set includes: the decoder allocates a numerical value out of a preset range to the virtual parameter set as the ID of the virtual parameter set.

In an example embodiment, the step that the decoder allocates the numerical value out of the preset range to the virtual parameter set as the ID of the virtual parameter set includes: the decoder employs a numerical value of a parameter set ID out of the preset range in the bitstream of the slice as the ID of the virtual parameter set.

In an example embodiment, the method further includes: the decoder activates an existing virtual parameter set.

In an example embodiment, the step that the decoder activates the existing virtual parameter set includes: the decoder activates a virtual parameter set which is configured for current slice and has been generated before decoding the current slice with the same virtual parameter set ID; and the decoder configures the tool parameters and/or control parameters for the slice decoding process using parameters in the activated virtual parameter set.

According to still another embodiment of the disclosure, a device for encoding using parameter sets is also provided, which is applied to an encoder and includes: a first determination component, configured to determine parameter sets and/or virtual parameter sets for a slice, wherein the virtual parameter set is a data structure which is generated by loading information acquired from a bitstream into a syntax structure of an existing parameter set and/or a preset syntax structure and includes tool parameters and/or control parameters; and a first processing component, configured to write IDs of the parameter sets and/or virtual parameter sets into the bitstream.

In an example embodiment, the first determination component includes: a first judgment component, configured to judge whether at least one of the following conditions meets or not: tool parameters and/or control parameters for encoding current slice are the same as tool parameters and/or control parameters of the existing parameter set, the tool parameters and/or control parameters for encoding the current slice are the same as tool parameters and/or control parameters in an existing virtual parameter set; a second determination component, configured to, if a judgment result of the first judgment component is positive, determine the existing parameter set which is determined by the first judgment component to have the same tool parameters and/or control parameters as the parameter set for the slice, and/or determine the existing virtual parameter set which is determined by the first judgment component to have the same tool parameters and/or control parameters as the virtual parameter set for the slice; and a third determination component, configured to, if the judgment result of the first judgment component is negative, employ a generated parameter set as the parameter set for the slice, and/or employ a constructed virtual parameter set as the virtual parameter set for the slice.

In an example embodiment, the first processing component is configured to write an ID of the parameter set which is determined by the first judgment component to have the same tool parameters and/or control parameters and/or an ID of the virtual parameter set which is determined by the first judgment component to have the same tool parameters and/or control parameters into one of the following bitstreams: an SH bitstream, a bitstream employing the parameter set with the same tool parameters and/or control parameters and/or a bitstream employing the virtual parameter set with the same tool parameters and/or control parameters.

In an example embodiment, the first processing component includes: a second judgment component, configured to identify that the tool parameters and/or control parameters for the current encoding slice are partially but not completely the same as the tool parameters and/or control parameters of the parameter set; a first setting component, configured to set a value of a syntax element corresponding to the ID of the parameter set in SH of the current encoding slice as a first preset value; a second processing component, configured to write the first preset value into the bitstream using an entropy coding method; and/or a second setting component, configured to set a value of a syntax element corresponding to a parameter set ID of the parameter set including the tool parameters and/or the control parameters as a second preset value; a third processing component, configured to write the second preset value into the bitstream using the entropy coding method; a third judgment component, configured to identify that the tool parameters and/or control parameters for the current encoding slice are completely different from the tool parameters and/or control parameters of the parameter set; a first generation component, configured to generate a parameter set including the tool parameters and/or control parameters for the current encoding slice; a first allocation component, configured to allocate an ID to the parameter set for the current encoding slice; a third setting component, configured to set the value of the syntax element corresponding to the ID of the parameter set in the SH of the current encoding slice to be the ID of the generated parameter set; and a fourth processing component, configured to write the ID of the generated parameter set into the bitstream using the entropy coding method.

In an example embodiment, the first determination component includes: a fourth judgment component, configured to judge, by the encoder, whether the tool parameters and/or control parameters for the current encoding slice are partially but not completely the same as the tool parameters and/or control parameters in the parameter set or not, and a virtual parameter set with a tool parameters and/or control parameters completely the same as the tool parameters and/or control parameters for the current encoding slice is able to be constructed or not; a fifth processing component, configured to, if a judgment result of the fourth judgment component is positive, construct, by the encoder, a virtual parameter set based on data in the existing parameter sets as the virtual parameter set for the slice; a fourth determination component, configured to determine the ID of the virtual parameter set for the slice; a second generation component, configured to, if the judgment result of the fourth judgment component is negative, generate a parameter set including the tool parameters and/or the control parameters; and a second allocation component, configured to allocate an ID to the generated parameter set.

In an example embodiment, the first processing component includes: a fourth setting component, configured to set the value of the syntax element corresponding to the parameter set ID in the SH of the current encoding slice as the ID of the generated virtual parameter set; a fifth processing component, configured to write the value into the bitstream using an entropy coding method; and/or a fifth setting component, configured to set the value of the syntax element corresponding to the parameter set ID in the parameter set including the tool parameters and/or the control parameters as the ID of the virtual parameter set; a sixth processing component, configured to write the ID of the generated virtual parameter set into the bitstream using the entropy coding method; or a sixth setting component, configured to set the value of the syntax element corresponding to the parameter set ID in the SH of the current encoding slice as the ID of the generated parameter set; and a seventh processing component, configured to write the ID of the generated parameter set into the bitstream using the entropy coding method.

According to still another embodiment of the disclosure, a device for decoding using parameter sets is also provided, which is applied to a decoder and includes: a third generation component, configured to generate a virtual parameter set, wherein the virtual parameter set is a data structure which is generated by loading information acquired from a bitstream into a data element structure of an existing parameter set and/or a preset data element structure and includes tool parameters and/or control parameters; a third allocation component, configured to allocate an ID to the virtual parameter set; a first activation component, configured to activate the virtual parameter set according to the ID of the virtual parameter set; and a first decoding component, configured to configure tool parameters and/or control parameters for a slice decoding process according to parameters in the virtual parameter set.

In an example embodiment, the device further includes: a fifth judgment component, configured to determine that one or more types of preset tool parameters and/or control parameters are able to be acquired from one or more independent elements in the bitstream.

In an example embodiment, the device further includes: an acquisition component, configured to acquire IDs of parameter sets directly and/or indirectly referred to by a slice from the bitstream; and a sixth judgment component, configured to determine that values of the IDs of the parameter sets directly and/or indirectly referred to by the slice are out of a preset value range.

In an example embodiment, the third generation component is configured to generate the virtual parameter set by loading information acquired from one or more independent elements of the bitstream into a syntax structure of the existing parameter set or a preset syntax structure, wherein the virtual parameter set includes all and/or a part of information included in the one or more independent elements in the bitstream.

In an example embodiment, the third generation component includes: a decomposition component, configured to decompose the ID of the parameter set directly or indirectly referred to by the slice into index numbers of the one or more independent elements for constructing the virtual parameter set according to the ID of the parameter set directly or indirectly referred to by the slice; and a fourth generation component, configured to acquire the information from the one or more independent elements in the bitstream according to the index numbers of the one or more independent elements, and generate the virtual parameter set according to the syntax structure of the existing parameter set or the preset syntax structure.

In an example embodiment, the fourth generation component is configured to construct the virtual parameter set based on all or a part of tool parameters and/or control parameters included in one or more front independent elements according to the parsing order of the index numbers of multiple independent elements.

In an example embodiment, the third allocation component includes: a fourth allocation component, configured to allocate an ID reserved for the virtual parameter set to the virtual parameter set.

In an example embodiment, the fourth allocation component allocates a reserved fixed numerical value to the virtual parameter set as the ID of the virtual parameter set.

In an example embodiment, the third allocation component includes: a fifth allocation component, configured to allocate a numerical value out of a preset range to the virtual parameter set as the ID of the virtual parameter set.

In an example embodiment, the fifth allocation component is configured to employ, by the decoder, a numerical value of a parameter set ID out of the preset range in the bitstream of the slice as the ID of the virtual parameter set.

In an example embodiment, the device further includes: a second activation component, configured to activate an existing virtual parameter set.

In an example embodiment, the second activation component includes: a third activation component, configured to activate a virtual parameter set which is configured for current slice and has been generated before decoding the current slice with the same virtual parameter set ID; and a second decoding component, configured to configure the tool parameters and/or control parameters for the slice decoding process using parameters in the activated virtual parameter set.

According to still another embodiment of the disclosure, electronic equipment is also provided, which includes: the above-mentioned device for encoding using parameter sets and/or the above-mentioned device for decoding using parameter sets.

According to the embodiments of the disclosure, the virtual parameter set is used to encode and decode data, so that the problem of relatively complex flows of methods for encoding and decoding using parameters in the related art is solved, and the effect of improving encoding and decoding efficiency is further achieved.

BRIEF DESCRIPTION OF THE DRAWINGS

The drawings are described here to provide further understanding of the disclosure, and form a part of the disclosure. The schematic embodiments and description of the disclosure are used to explain the disclosure, and do not form improper limits to the disclosure. In the drawings.

DETAILED DESCRIPTION OF THE EMBODIMENTS

The disclosure is described below with reference to the drawings and embodiments in detail. It is important to note that the embodiments of the disclosure and the characteristics in the embodiments can be combined under the condition of no conflicts.

Figure 1:
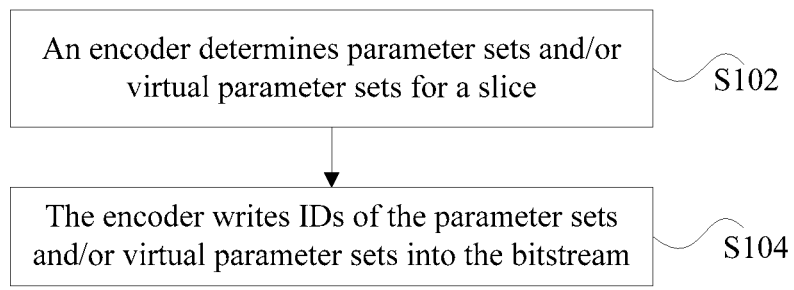
FIG. 1 is a flowchart of a method for encoding parameters according to an embodiment of the disclosure.

An example embodiment provides a method for encoding using parameter sets. FIG. 1 is a flowchart of a method for encoding parameters according to an embodiment of the disclosure. As shown in FIG. 1, the method includes the following Step S102 to Step S104.

Step S102: an encoder determines parameter sets and/or virtual parameter sets for a slice, wherein the virtual parameter set is a data structure which is generated by loading information acquired from a bitstream into a syntax structure of an existing parameter set and/or a preset syntax structure and includes tool parameters and/or control parameters.

Step S104: the encoder writes IDs of the parameter sets and/or virtual parameter sets into the bitstream.

By the steps, the encoder writes the IDs of the parameter sets and/or virtual parameter sets for the slice into the bitstream, so that a flow of determining encoding parameters in an encoding process by the encoder can be simplified, and encoding and decoding efficiency is further improved.

During implementation, the parameter sets and/or virtual parameter sets for the slice may be determined in multiple manners. For example: tool parameters and/or control parameters for encoding current slice may be judged whether to be the same as tool parameters and/or control parameters of the existing parameter set and/or an existing virtual parameter set or not for determination. In an example embodiment, the encoder determines whether at least one of the following conditions meets or not: the tool parameters and/or control parameters for encoding the current slice are the same as the tool parameters and/or control parameters of the existing parameter set; and the tool parameters and/or control parameters for encoding the current slice are the same as tool parameters and/or control parameters in an existing virtual parameter set. When the judgment result is positive, the encoder may determine the existing parameter set with the same tool parameters and/or control parameters as the parameter set for the slice, and/or determine the existing virtual parameter set with the same tool parameters and/or control parameters as the virtual parameter set for the slice. When the judgment result is negative, the encoder may generate a parameter set or construct a virtual parameter set, employ the generated parameter set as the parameter set for the slice and/or employ the constructed virtual parameter set as the virtual parameter set for the slice. By this example implementation mode, the use of the existing parameter set in the encoding process is realized, so that encoding compatibility and efficiency are improved.

Corresponding to the example implementation mode, the IDs of the parameter sets and/or virtual parameter sets may be written into the bitstream in a manner as follows in order to improve the accuracy of writing of IDs into the bitstream. The encoder may write an ID of the parameter set with the same tool parameters and/or control parameters and/or an ID of the virtual parameter set with the same tool parameters and/or control parameters into one of the following bitstreams: an SH bitstream, a bitstream employing the parameter set with the same tool parameters and/or control parameters and/or a bitstream employing the virtual parameter set with the same tool parameters and/or control parameters.

During implementation, the IDs may be written into the bitstream in manners as follows according to a relationship between the tool parameters and/or control parameters for the current encoding slice and the tool parameters and/or control parameters of the parameter set.

Manner 1: when the tool parameters and/or control parameters for the current encoding slice are identified to be partially but not completely the same as the tool parameters and/or control parameters of the parameter set, the encoder sets a value of a syntax element corresponding to the ID of the parameter set in an SH of the current encoding slice (i.e., the slice currently being processed by the encoder) as a first preset value, and writes the first preset value into the bitstream using an entropy coding method; and/or the encoder sets a value of a syntax element corresponding to a parameter set ID of the parameter set including the tool parameters and/or the control parameters as a second preset value, and writes the second preset value into the bitstream using the entropy coding method.

Manner 2: when the encoder identifies that the tool parameters and/or control parameters for the current encoding slice are completely different from the tool parameters and/or control parameters of the parameter set, the encoder generates a parameter set including the tool parameters and/or control parameters for the current encoding slice; an ID is allocated to the parameter set for the current encoding slice; and the value of the syntax element corresponding to the ID of the parameter set in the SH of the current encoding slice is set to be the ID of the generated parameter set, and the ID of the generated parameter set is written into the bitstream using the entropy coding method.

During implementation, the parameter sets and/or virtual parameter sets for the slice may also be determined by the encoder in a manner of judging whether the tool parameters and/or control parameters for the current encoding slice are partially but not completely the same as the tool parameters and/or control parameters in the parameter set or not, and a virtual parameter set with a tool parameters and/or control parameters completely the same as the tool parameters and/or control parameters for the current encoding slice is able to be constructed or not.

Manner 1: when the judgment result is positive, the encoder may construct a virtual parameter set by loading data in the existing parameter sets as the virtual parameter set for the slice, and determine the ID of the virtual parameter set for the slice.

Manner 2: when the judgment result is negative, the encoder generates a parameter set including the tool parameters and/or the control parameters, and allocates an ID to the generated parameter set.

Corresponding to the example implementation mode, the encoder may write the IDs of the parameter sets and/or virtual parameter sets into the bitstream in one of manners as follows.

Manner 1: the encoder sets values of a syntax element corresponding to the ID of the parameter set in the SHs included in an Access Element (AU) where the current encoding slice is located as an ID of the generated virtual parameter set, and writes the value into the bitstream using an entropy coding method; and/or the encoder sets the value of the syntax element corresponding to the parameter set ID in the parameter set including the tool parameters and/or the control parameters as the ID of the virtual parameter set, and writes the ID of the generated virtual parameter set into the bitstream using the entropy coding method.

Manner 2: the encoder sets the value of the syntax element corresponding to the parameter set ID in the SH of the current encoding slice as the ID of the generated parameter set, and writes the ID of the generated parameter set into the bitstream using the entropy coding method.

As an example implementation mode, the tool parameters and/or the control parameters are depth information parameters, and the tool parameters and/or the control parameters includes at least one of: parameters for depth information digital presentation, attribute parameters of camera imaging system and camera arrangement manner related parameters.

Figure 2:
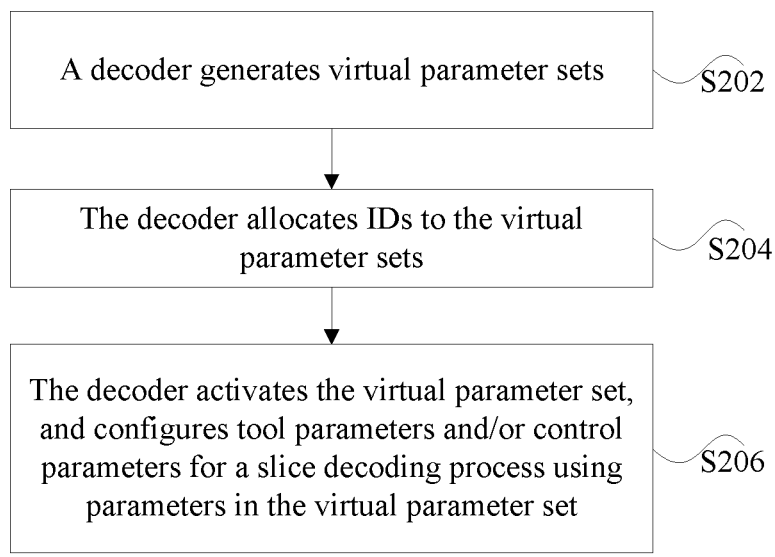
FIG. 2 is a flowchart of a method for decoding parameters according to an embodiment of the disclosure.

An example embodiment provides a method for decoding using parameter sets. FIG. 2 is a flowchart of a method for decoding parameters according to an embodiment of the disclosure. As shown in FIG. 2, the method includes the following Step S202 to Step S206.

Step S202: a decoder generates a virtual parameter set, wherein the virtual parameter set is a data structure which is generated by loading information acquired from a bitstream into a data element structure of an existing parameter set and/or a preset data element structure and includes tool parameters and/or control parameters.

Step S204: the decoder allocates an ID to the virtual parameter set.

Step S206: the decoder activates the virtual parameter set according to the ID of the virtual parameter set, and configures tool parameters and/or control parameters for slice decoding process according to parameters in the virtual parameter set.

By the steps, the decoder generates a virtual parameter set, allocates an ID to the parameter set, activates the virtual parameter set according to the ID, and configures tool parameters and/or control parameters for the slice decoding process according to parameters in the virtual parameter set, so that a flow of determining decoding parameters by the decoder in a decoding process can be simplified, and decoding efficiency is further improved.

As an example implementation mode, in order to improve the decoding efficiency, before Step S202, the decoder may also determine that one or more types of preset tool parameters and/or control parameters are able to be acquired from one or more independent elements in the bitstream.

As an example implementation mode, in order to improve the decoding efficiency, before Step S202, the decoder may also acquire an ID of a parameter set directly and/or indirectly referred to by a slice from the bitstream; and the decoder determines that values of the IDs of the parameter sets directly and/or indirectly referred to by the slice are out of a preset value range.

During implementation, the decoder may generate the virtual parameter set in multiple implementation modes. For example: the decoder generates the virtual parameter set by loading information acquired from one or more independent elements of the bitstream into a syntax structure of the existing parameter set or a preset syntax structure, wherein the virtual parameter set includes all and/or a part of information included in the one or more independent elements in the bitstream. In an example embodiment, the decoder may decompose the ID of the parameter set directly or indirectly referred to by the slice into index numbers of the one or more independent elements for constructing the virtual parameter set according to the ID of the parameter set directly or indirectly referred to by the slice; and the decoder acquires the information from the one or more independent elements in the bitstream according to the index numbers of the one or more independent elements, and generates the virtual parameter set according to the syntax structure of the existing parameter set or the preset syntax structure.

In an example embodiment, in order to improve decoding accuracy, the decoder may construct the virtual parameter set based on all or a part of tool parameters and/or control parameters included in one or more front independent elements according to parsing order of the index numbers of multiple independent elements.

In an example embodiment, the index numbers of the independent elements are IDs of existing parameter sets.

In an example embodiment, the independent elements in the bitstream are data elements divided by delimiters periodically appearing in the bitstream. In an example embodiment, the data elements are NAL units.

As an example implementation mode, the decoder may allocate the ID to the virtual parameter set in one of manners as follows.

Manner 1: the decoder allocates an ID reserved for the virtual parameter set to the virtual parameter set. In an example embodiment, the decoder allocates a reserved fixed numerical value to the virtual parameter set as the ID of the virtual parameter set.

Manner 2: the decoder allocates a numerical value out of a preset range to the virtual parameter set as the ID of the virtual parameter set. In an example embodiment, the decoder employs a numerical value of a parameter set ID out of the preset range in the bitstream of the slice as the ID of the virtual parameter set.

As an example implementation mode, the method may further include: the decoder activates an existing virtual parameter set. In an example embodiment, the step may be implemented in a manner as follows: the decoder activates a virtual parameter set configured for current slice, which is generated before decoding the current slice and has the same virtual parameter set ID; and the decoder configures the tool parameters and/or control parameters for the slice decoding process using parameters in the activated virtual parameter set.

It should be noted that the steps shown by the flowchart in the drawing can be executed in a computer system, such as a group of computers, capable of executing an instruction, and moreover, a logic sequence is shown in the flowchart, but the shown or described steps can be executed in a sequence different from the logic sequence under a certain condition.

In another embodiment, software for encoding using parameter sets is also provided, which is configured to execute the technical solutions described by the abovementioned embodiments and example embodiments.

In another embodiment, a storage medium is also provided, in which the software for encoding using parameter sets is stored, wherein the storage medium includes, but not limited to: an optical disk, a floppy disk, a hard disk, an erasable memory and the like.

An embodiment of the disclosure provides a device for encoding using parameter sets, which may be applied to an encoder. The device for encoding using parameter sets may be configured to implement the method for encoding using parameter sets and the example implementation modes, that what has been described will not be repeated, and components involved in the device for encoding using parameter sets are described below. For example, a term "component", used below, is a combination of software and/or hardware for realizing preset functions. The systems and methods described in the following embodiment are preferably implemented by software, but the implementation of the systems and the methods with hardware or the combination of software and hardware is also possible and conceived.

Figure 3:
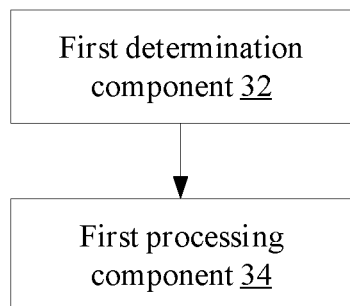
FIG. 3 is a structure diagram of a device for encoding parameters according to an embodiment of the disclosure.

FIG. 3 is a structure diagram of a device for encoding parameters according to an embodiment of the disclosure. As shown in FIG. 3, the device includes: a first determination component 32 and a first processing component 34. The structure is described below in detail.

The first determination component 32 is configured to determine parameter sets and/or virtual parameter sets for a slice, wherein the virtual parameter set is a data structure which is generated by loading information acquired from a bitstream into a syntax structure of an existing parameter set and/or a preset syntax structure and includes tool parameters and/or control parameters; and the first processing component 34 is coupled with the first determination component 32, and is configured to write IDs of the parameter sets and/or virtual parameter sets determined by the first determination component 32 into the bitstream.

Figure 4:
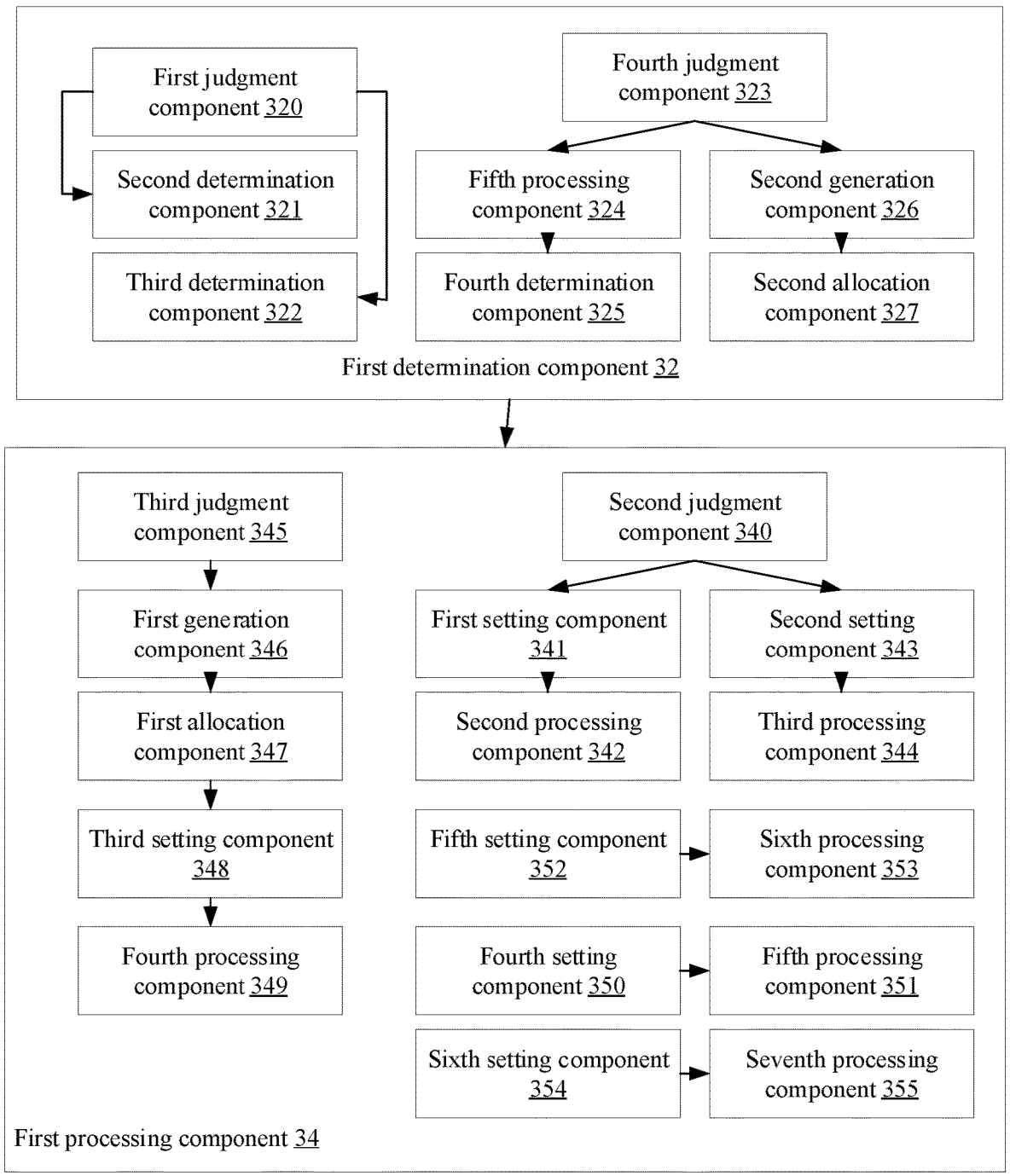
FIG. 4 is an example structure diagram of a device for encoding parameters according to an embodiment of the disclosure.

FIG. 4 is an example structure diagram of a device for encoding parameters according to an embodiment of the disclosure. As shown in FIG. 4, the example structure diagram of the device for encoding the parameters includes a first determination component 32 and a first processing component 34. The structure is described below in detail.

The first determination component 32 includes:
a first judgment component 320, configured to judge whether at least one of the following conditions meets or not: tool parameters and/or control parameters for encoding current slice are the same as tool parameters and/or control parameters of the existing parameter set, the tool parameters and/or control parameters for encoding the current slice are the same as tool parameters and/or control parameters in an existing virtual parameter set; a second determination component 321, coupled with the first judgment component 320 and configured to, if a judgment result of the first judgment component 320 is positive, determine the existing parameter set which is determined by the first judgment component to have the same tool parameters and/or control parameters as the parameter set for the slice, and/or determine the existing virtual parameter set which is determined by the first judgment component to have the same tool parameters and/or control parameters as the virtual parameter set for the slice; and a third determination component 323, coupled with the first judgment component 320 and configured to, if the judgment result of the first judgment component 320 is negative, employ a generated parameter set as the parameter set for the slice, and/or employ a constructed virtual parameter set as the virtual parameter set for the slice.

In an example embodiment, the first processing component 34 is configured to write an ID of the parameter set which is determined by the first judgment component 322 to have the same tool parameters and/or control parameters and/or an ID of the virtual parameter set which is determined by the first judgment component 320 to have the same tool parameters and/or control parameters into one of the following bitstreams: an SH bitstream, a bitstream including the parameter set with the same tool parameters and/or control parameters and/or a bitstream including the virtual parameter set with the same tool parameters and/or control parameters.

In an example embodiment, the first processing component 34 includes:
a second judgment component 340, configured to identify that the tool parameters and/or control parameters for the current encoding slice are partially but not completely the same as the tool parameters and/or control parameters of the parameter set; a first setting component 341, configured to set a value of a syntax element corresponding to the ID of the parameter set in an SH of the current encoding slice as a first preset value; a second processing component 342, configured to write the first preset value into the bitstream using an entropy coding method; and/or a second setting component 343, configured to set a value of a syntax element corresponding to a parameter set ID of the parameter set including the tool parameters and/or the control parameters as a second preset value; a third processing component 344, configured to write the second preset value into the bitstream using the entropy coding method;

a third judgment component 345, configured to identify that the tool parameters and/or control parameters for the current encoding slice are completely different from the tool parameters and/or control parameters of the parameter set; a first generation component 346, coupled with the third judgment component 345 and configured to generate a parameter set including the tool parameters and/or control parameters for the current encoding slice; a first allocation component 347, coupled with the first generation component 346 and configured to allocate an ID to the parameter set for the current encoding slice; a third setting component 348, coupled with the first allocation component 347 and configured to set the value of the syntax element corresponding to the ID of the parameter set in the SH of the current encoding slice to be the ID of the generated parameter set; and a fourth processing component 349, coupled with the third setting component 348 and configured to write the ID of the generated parameter set into the bitstream using the entropy coding method.

In an example embodiment, the first determination component 32 includes:

a fourth judgment component 323, configured to judge, by the encoder, whether the tool parameters and/or control parameters for the current encoding slice are partially but not completely the same as the tool parameters and/or control parameters in the parameter set or not, and a virtual parameter set with a tool parameters and/or control parameters completely the same as the tool parameters and/or control parameters for the current encoding slice is able to be constructed or not; a fifth processing component 324, coupled with the fourth judgment component 323 and configured to, if a judgment result of the fourth judgment component 323 is positive, construct, by the encoder, a virtual parameter set based on data in the existing parameter set as the virtual parameter set for the slice; a fourth determination component 325, configured to determine the ID of the virtual parameter set for the slice;

a second generation component 326, coupled with the fourth judgment component 323 and configured to, if the judgment results of the fourth judgment component 323 are negative, generate a parameter set including the tool parameters and/or the control parameters; and a second allocation component 327, coupled with the second generation component 326 and configured to allocate an ID to the generated parameter set.

In an example embodiment, the first processing component 34 includes:

a fourth setting component 350, configured to set the value of the syntax element corresponding to the parameter set ID in the SH of the current encoding slice as the ID of the generated virtual parameter set; a fifth processing component 351, configured to write the value into the bitstream using an entropy coding method; and/or a fifth setting component 352, configured to set the value of the syntax element corresponding to the parameter set ID in the parameter set including the tool parameters and/or the control parameters as the ID of the virtual parameter set; a sixth processing component 353, configured to write the ID of the generated virtual parameter set into the bitstream using the entropy coding method; or a sixth setting component 354, configured to set the value of the syntax element corresponding to the parameter set ID in the SH of the current encoding slice as the ID of the generated parameter set; and a seventh processing component 355, coupled with the sixth setting component 354 and configured to write the ID of the generated parameter set into the bitstream by virtue of the entropy coding method.

In another embodiment, software for decoding using parameter sets is also provided, which is configured to execute the technical solutions described in the abovementioned embodiments and example embodiments.

In another embodiment, a storage medium is also provided, in which the software for decoding using a parameter set is stored, wherein the storage medium includes, but not limited to: an optical disk, a floppy disk, a hard disk, an erasable memory and the like.

An embodiment of the disclosure provides a device for decoding using parameter sets. The device for decoding using parameter sets may be configured to implement the method for decoding using parameter sets and the example implementation modes, that what has been described will not be repeated, and components involved in the device for decoding using parameter sets are described below. For example, a term "component", used below, is a combination of software and/or hardware for realizing preset functions. The system and method described in the following embodiment are preferably implemented by software, but the implementation of the system and the method with hardware or the combination of software and hardware is also possible and conceived.

Figure 5:
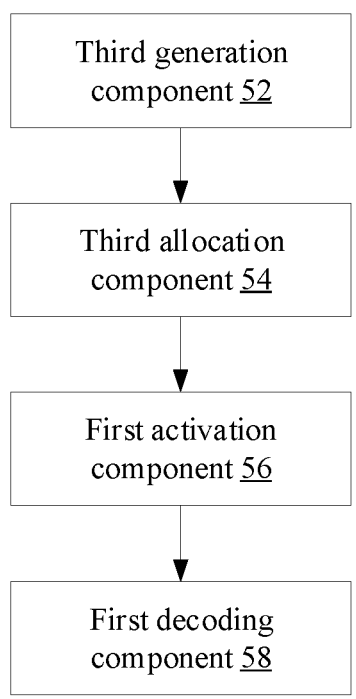
FIG. 5 is a structure diagram of a device for decoding parameters according to an embodiment of the disclosure.

FIG. 5 is a structure diagram of a device for decoding parameters according to an embodiment of the disclosure. As shown in FIG. 5, the device includes: a third generation component 52, a third allocation component 54, a first activation component 56 and a first decoding component 58. The structure is described below in detail.

The third generation component 52 is configured to generate virtual parameter sets, wherein the virtual parameter set is a data structure which is generated by loading information acquired from a bitstream into a data element structure of an existing parameter set and/or a preset data element structure and includes tool parameters and/or control parameters; the third allocation component 54 is coupled with the third generation component 52, and is configured to allocate an ID to the virtual parameter set; the first activation component 56 is coupled with the third allocation component 54, and is configured to activate the virtual parameter set according to the ID, which is allocated by the third allocation component 54, of the virtual parameter set; and the first decoding component 58 is coupled with the first activation component 56, and is configured to configure tool parameters and/or control parameters for slice decoding process according to parameters in the virtual parameter set.

Figure 6:
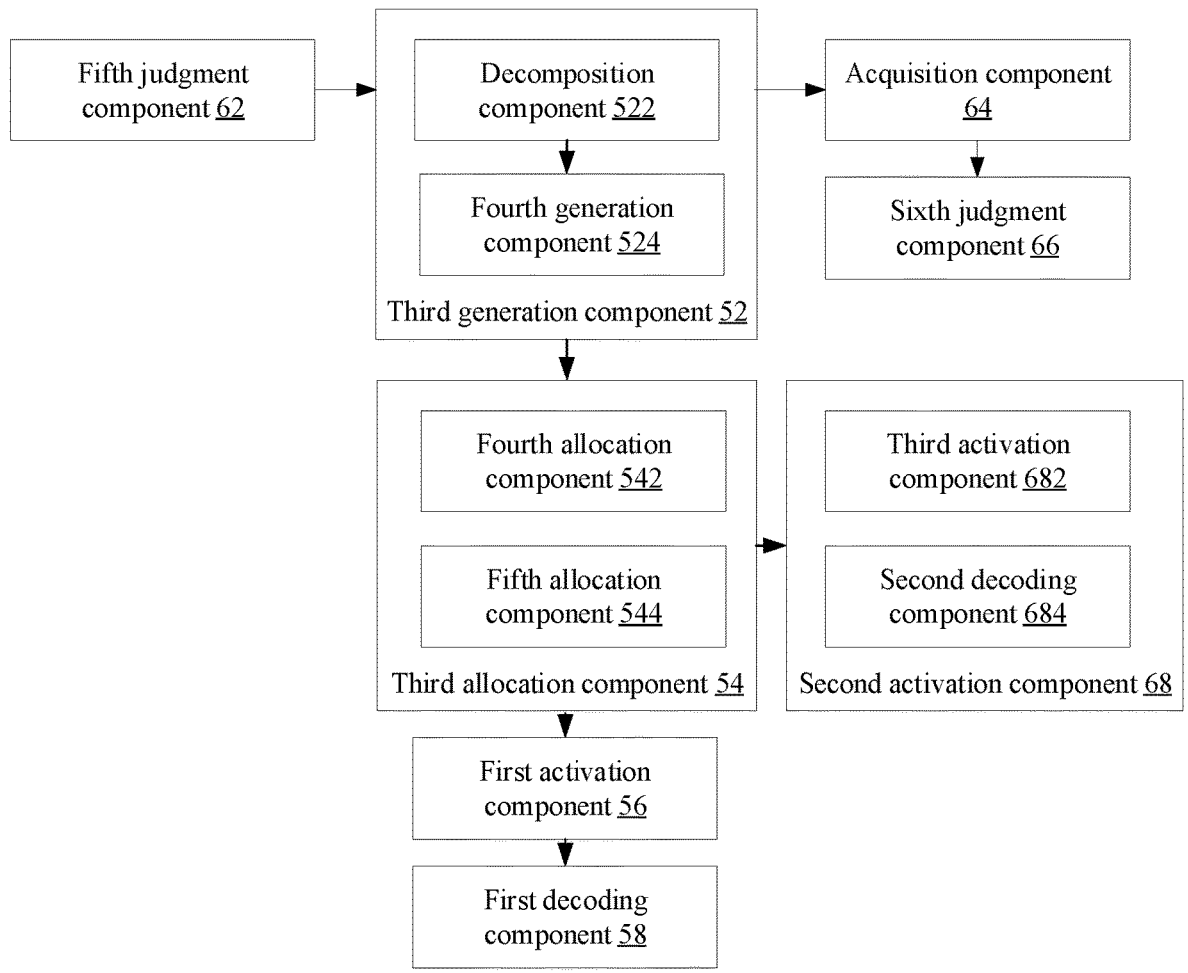
FIG. 6 is an example structure diagram of a device for decoding parameters according to an embodiment of the disclosure.

FIG. 6 is an example structure diagram of a device for decoding parameters according to an embodiment of the disclosure. As shown in FIG. 6, the device further includes: a fifth judgment component 62, an acquisition component 64 and a sixth judgment component 66. The third generation component 52 includes: a decomposition component 522 and a fourth generation component 524. The third allocation component 54 includes: a fourth allocation component 542 and a fifth allocation component 544. The device further includes: a second activation component 68, wherein the second activation component 68 includes: a third activation component 682 and a second decoding component 684. The structure is described below in detail.

In an example embodiment, the device further includes: the fifth judgment component 62, configured to determine that one or more types of preset tool parameters and/or control parameters are able to be acquired from one or more independent elements in the bitstream.

In an example embodiment, the device further includes: the acquisition component 64, configured to acquire an IDs of parameter sets directly and/or indirectly referred to by a slice from the bitstream; and the sixth judgment component 66, coupled with the acquisition component 64 and configured to determine that values of the IDs, which are acquired by the acquisition component 64, of the parameter sets directly and/or indirectly referred to by the slice are out of a preset value range.

In an example embodiment, the third generation component 52 is configured to generate the virtual parameter set by loading information acquired from one or more independent elements of the bitstream into a syntax structure of the existing parameter set or a preset syntax structure, wherein the virtual parameter set includes all and/or a part of information included in the one or more independent elements in the bitstream.

The third generation component 52 includes: the decomposition component 522, configured to decompose the ID of the parameter set directly or indirectly referred to by the slice into index numbers of the one or more independent elements for constructing the virtual parameter set according to the ID of the parameter set directly or indirectly referred to by the slice; and the fourth generation component 524, coupled with the decomposition component 522 and configured to acquire the information from the one or more independent elements in the bitstream according to the index numbers of the one or more independent elements, and generate the virtual parameter set according to the syntax structure of the existing parameter set or the preset syntax structure.

In an example embodiment, the fourth generation component 524 is configured to construct the virtual parameter set based on all or a part of tool parameters and/or control parameters included in one or more front independent elements according to a parsing order of the index numbers of multiple independent elements.

In an example embodiment, the third allocation component 54 includes: the fourth allocation component 542, configured to allocate an ID reserved for the virtual parameter set to the virtual parameter set. In an example embodiment, the fourth allocation component 542 is configured to allocate a reserved fixed numerical value to the virtual parameter set as the ID of the virtual parameter set.

In an example embodiment, the third allocation component 54 includes: the fifth allocation component 544, configured to allocate a numerical value out of a preset range to the virtual parameter set as the ID of the virtual parameter set. In an example embodiment, the fifth allocation component 544 is configured to employ, by the decoder, a numerical value of a parameter set ID out of the preset range in the bitstream of the slice as the ID of the virtual parameter set.

In an example embodiment, the device further includes: the second activation component 68, configured to activate an existing virtual parameter set.

In an example embodiment, the second activation component 68 includes: the third activation component 682, configured to activate virtual parameter sets configured for current slice, which is generated before decoding the current slice and has the same virtual parameter set ID; and the second decoding component 684, coupled with the third activation component 682 and configured to configure the tool parameters and/or control parameters for the slice decoding process using parameters in the activated virtual parameter set.

Figure 7:
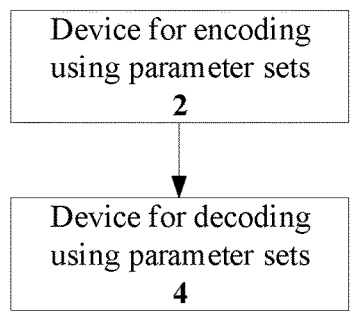
FIG. 7 is a structure diagram of electronic equipment according to an embodiment of the disclosure.

An embodiment of the disclosure provides electronic equipment. FIG. 7 is a structure diagram of electronic equipment according to an embodiment of the disclosure. As shown in FIG. 7, the electronic equipment includes a device 2 (as shown in FIG. 3 or 4) for encoding using parameter sets and/or a device 4 (as shown in FIG. 5 or 6) for decoding using parameter sets.

Description is given below with reference to example embodiments, and the following example embodiments combine the abovementioned embodiments and example embodiments.

Example Embodiment 1

Figure 8:
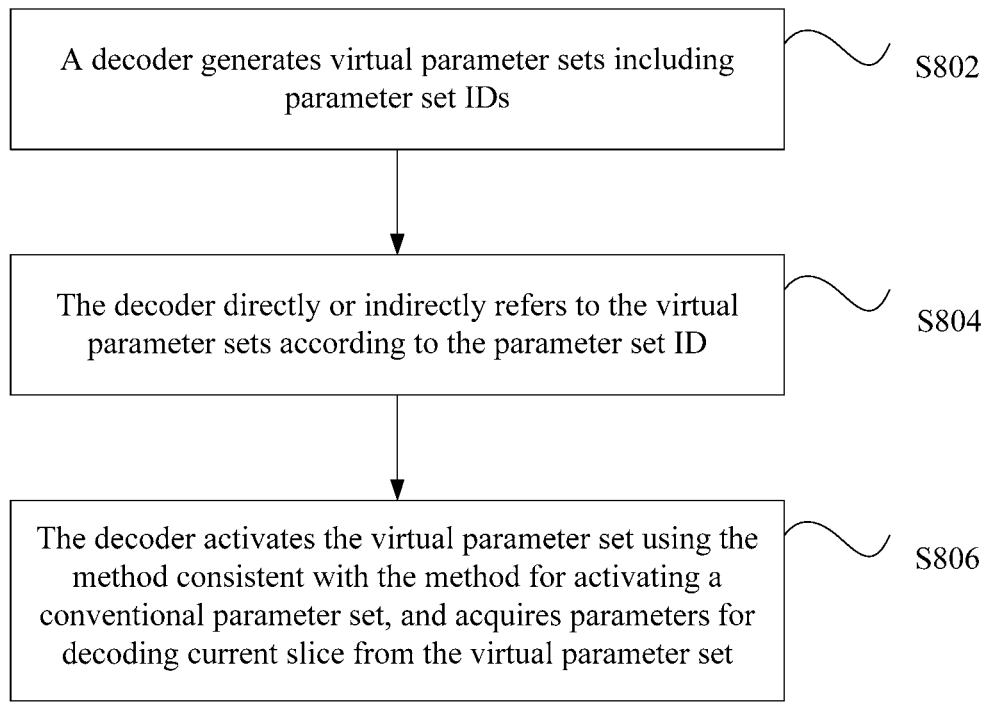
FIG. 8 is a flowchart of a method for decoding according to an embodiment of the disclosure.

The example embodiment provides a method for decoding using virtual parameter sets. FIG. 8 is a flowchart of a method for decoding according to an embodiment of the disclosure. As shown in FIG. 8, the method includes the following Step 802 to Step 806.

Step 802: a decoder generates a virtual parameter set including a parameter set ID.

Step 804: the decoder directly or indirectly refers to the virtual parameter set according to the parameter set ID.

Step 806: the decoder activates the virtual parameter set following the method consistent with the method for activating a conventional parameter set, and acquires parameters required by current slice decoding process from the virtual parameter set.

Example Embodiment 2

Figure 9:
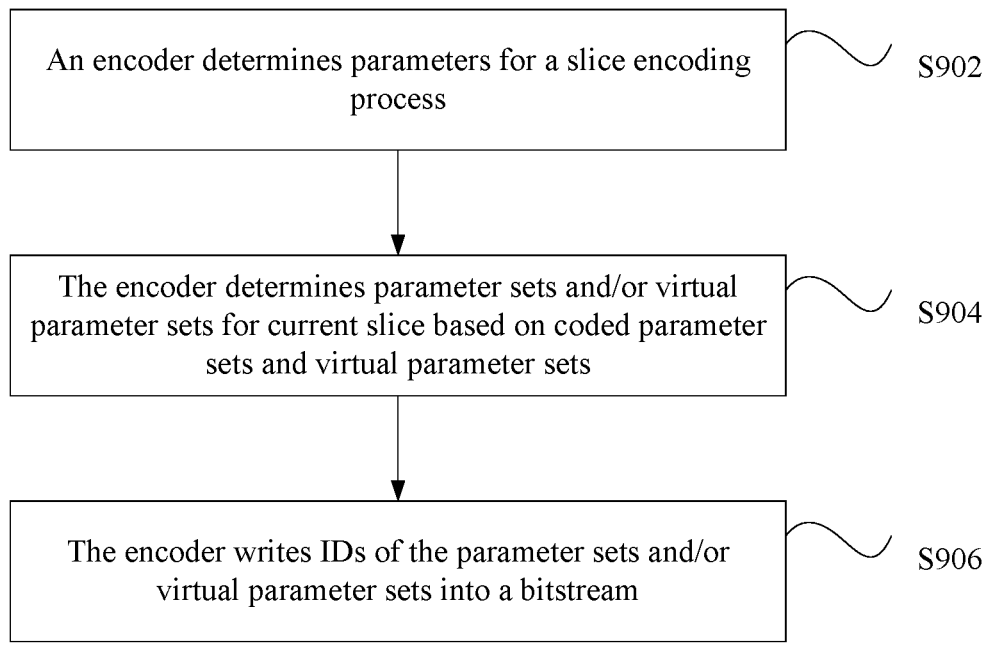
FIG. 9 is a flowchart of a method for encoding according to an embodiment of the disclosure.

The example embodiment provides a method for encoding using virtual parameter sets. FIG. 9 is a flowchart of a method for encoding according to an embodiment of the disclosure. As shown in FIG. 9, the method includes the following Step 902 to Step 906.

Step 902: an encoder determines parameters for slice encoding process.

Step 904: the encoder determines parameter sets and/or virtual parameter sets for current slice based on coded parameter sets and/or virtual parameter sets.

Step 906: the encoder writes IDs of the parameter sets and/or virtual parameter sets into a bitstream.

In an example embodiment, in the embodiment, existing information in a bitstream may be combined to generate a virtual parameter set including a parameter set ID according to a syntax structure of a conventional parameter set or an independently designed syntax structure.

In an example embodiment, in the bitstream, data of the parameter set are located in one independent NAL unit with a specific type ID, but data of the virtual parameter set may be from one or more different types of NAL units.

In an example embodiment, a method for operating the virtual parameter set at slice layer is the same as the method for operating an ordinary parameter set. The slice layer directly or indirectly refers to the virtual parameter sets according to the parameter set IDs. When a certain virtual parameter set is referred to, the virtual parameter set is activated by the method in the same way as that for the ordinary parameter set, and parameters required by current slice decoding process are acquired from the virtual parameter set.

It should be noted that with the use of the virtual parameter sets, special flows are not required to be set for certain specific parameter set IDs in a process of referring to the parameter set at slice layer and parameter set activation process; additional flags are not required to be introduced at slice layer with special conditional processing flows; and when activating ordinary parameter sets and/or virtual parameter sets, the decoder can clearly identify the decoding processes to which the data in parameter sets are applied, without referencing to the syntax elements following the parameter set IDs at slice layer in parsing order to determine and execute the corresponding additional judgments and operations.

An encoder implementation method in each following embodiment is only one of possible encoder implementation methods under the embodiment, and any encoder capable of generating a bitstream meeting a requirement of the encoding process in the embodiment may implement an encoder implementation method in the embodiment.

Example Embodiment 3

A method for organizing a subset SPS, a DPS and SH bitstream in the example embodiment is the same as a conventional 3D-AVC method.

Figure 10:
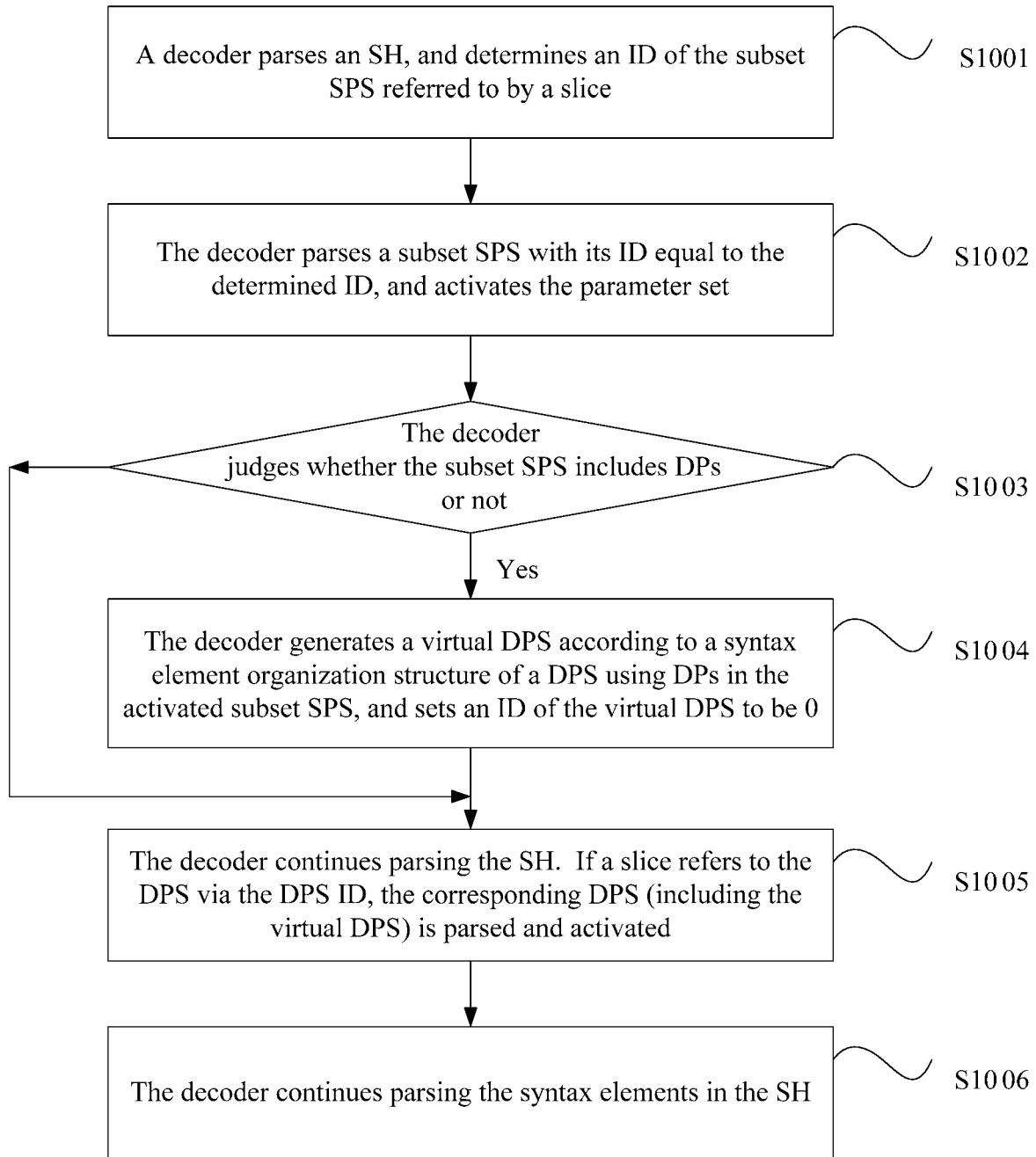
FIG. 10 is a first flowchart of a method for decoding according to an example embodiment of the disclosure.

FIG. 10 is a flowchart of a method for decoding according to an example embodiment of the disclosure. As shown in FIG. 10, the method for decoding in the embodiment includes the following Step S1001 to Step S1006.

Step S1001: a decoder parses an SH, and determines an ID of a subset SPS referred to by a slice.

The decoder reads a bitstream of the SH from a received bitstream, and parses pic_parameter_set_id of a Picture Parameter Set (PPS) referred to by a current slice using an entropy decoding method corresponding to ue(v).

The decoder sets a PPS with its ID value equal to pic_parameter_set_id to be "active". The decoder parses a bitstream of the PPS, and parses seq_parameter_set_id of a subset SPS referred to by the PPS using the entropy decoding method corresponding to ue(v).

The decoder sets a value of seq_parameter_set_id to be a value of the ID of the subset SPS referred to by the current slice.

Step S1002: the decoder parses a subset SPS corresponding to the ID, and activates the parameter set.

Step S1003: the decoder judges whether the subset SPS includes DPs or not. If the subset SPS includes DPs, Step S1004 is executed; otherwise, Step S1005 is executed.

Step S1004: the decoder generates a virtual parameter set, and executes Step S1005.

The decoder constructs a virtual DPS according to a DPS syntax element organization structure and method based on the DPs in the activated subset SPS, and sets an ID of the virtual DPS to be 0.

Alternatively, the decoder may construct the virtual DPS according to a preset syntax element organization method based on the DPs in the activated subset SPS, and sets the ID of the virtual DPS to be 0.

The preset syntax element organization method may be any representation method for DP data, such as a representation method for directly listing ZFar, ZNear and camera parameters or a representation method of splitting the ZFar, the ZNear and the camera parameters into integer parts and decimal parts.

Step S1005: the decoder continues parsing other syntax elements in the SH. If a slice layer refers to the DPS through the DPS ID, the corresponding DPS (including the virtual DPS) is parsed and activated.

When the decoder determines that DRWP and/or VSP are used in decoding the current slice, the decoder refers to the DPS via the DPS ID in the decoding process.

The decoder parses the dps_id of the DPS referred to by the current slice using the entropy decoding method corresponding to ue(v).

The decoder sets a DPS or virtual DPS with its ID value equal to dps_id to be "active", and acquires DPs used in decoding of the current slice from the currently activated DPS or virtual DPS using the conventional data processing method for an activated parameter set in 3D-AVC.

Step S1006: the decoder continues parsing the syntax elements in the SH.

Figure 11:
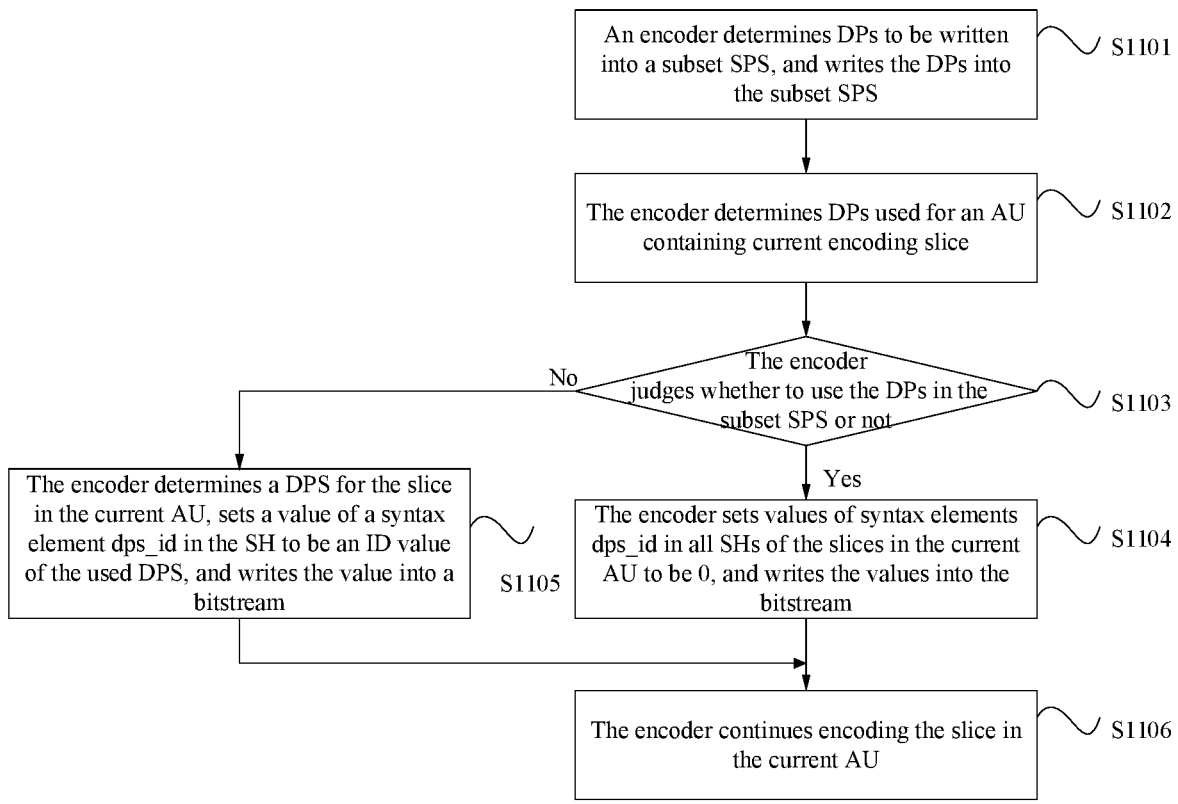
FIG. 11 is a first flowchart of a method for encoding according to an example embodiment of the disclosure.

FIG. 11 is a flowchart of a method for encoding according to an example embodiment of the disclosure. As shown in FIG. 11, the method for encoding in the embodiment includes the following Step S1101 to Step S1110.

Step S1101: an encoder determines DPs to be written into a subset SPS, and writes the DPs into the subset SPS.

For a non-real time application (such as storage playing), the encoder scans DPs required by the entire sequence, employs the DPs for most frames as the DPs to be written into the subset SPS, and writes the DPs into the subset SPS according to an organization method and entropy coding method for syntax elements related to these DPs in the subset SPS.

For an application tolerant to a certain time delay, the encoder starts scanning from a first frame of a sequence to a specified moment (such as a time delay upper limit), employs DPs for most frames as the DPs to be written into the subset SPS, and writes the DPs into the subset SPS according to the organization method and entropy coding method for the syntax elements related to these DPs in the subset SPS.

For a low delay application (such as a video conference), the encoder directly employs DPs of the first frame of the sequence as the DPs to be written into the subset SPS, and writes the DPs into the subset SPS according to the organization method and entropy coding method for the syntax elements related to these DPs in the subset SPS.

Step S1102: the encoder determines DPs used for an access unit (AU) where current slice is located.

The encoder may directly obtain camera parameters at the sampling time instant of the picture containing the current slice in current AU from an external control element.

If depth information is directly acquired from a depth camera, the encoder may acquire parameter values such as ZFar and ZNear at the sampling time instant of the picture containing the current slice in the current AU from a depth information processing element of the depth camera or a depth information processing element of a system.

If the depth information is estimated from 3DV video and information, the encoder can acquire the parameter values such as ZFar and ZNear at the sampling time instant of the picture containing the current slice in the current AU from a 3DV preprocessing element of the system.

The encoder acquires information such as ZFar, ZNear and the camera parameters from system equipment, and employs the information as the DPs for the AU containing the current slice.

Step S1103: the encoder judges whether the DPs for the current AU are the same as the DPs in the subset SPS or not. If the DPs for the current AU are the same as the DPs in the subset SPS, Step S1104 is executed; otherwise, Step S1105 is executed.

Step S1104: the encoder sets values of syntax elements dps_id in all SHs of the slices included in the current AU to be 0, and writes the values into bitstream using an entropy coding method corresponding to ue(v). Step S1106 is executed.

Step S1105: the encoder determines a DPS for the slice in the current AU, sets a value of a syntax element dps_id in the SH to be an ID value of the used DPS, and writes the value into the bitstream. Step S1106 is executed.

If the DPs for the current AU are the same as the DPs included in a certain coded DPS, the value of the syntax element dps_id in the SH is set to be the ID value of the DPS, and the value of dps_id is written into the bitstream using the entropy coding method corresponding to ue(v).

If the DPs for the current AU are different from DPs included in existing coded DPSs, a new DPS is generated using the method in 3D-AVC. DP information is written into the DPS, and an ID value is allocated to the DPS. The encoder sets the value of the syntax element dps_id in the SH to be the ID value of the DPS, and the value of dps_id is written into the bitstream using the entropy coding method corresponding to ue(v).

Step S1106: the encoder continues encoding the slice included in the current AU.

Example Embodiment 4

The syntax structures for subset SPS, DPS and SH in this example embodiment are the same as those in 3D-AVC method.

Figure 12:
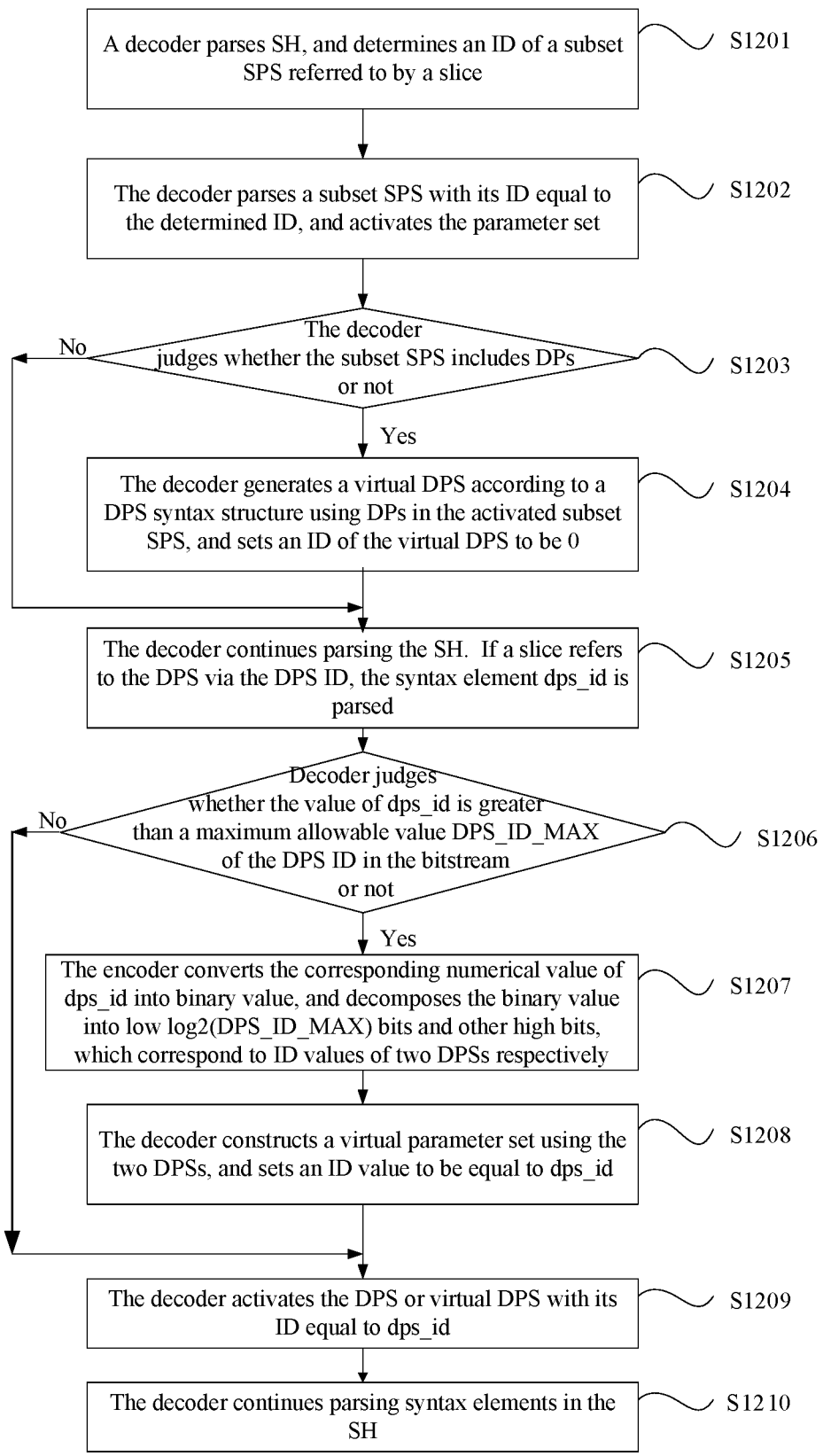
FIG. 12 is a second flowchart of a method for decoding according to an example embodiment of the disclosure.

FIG. 12 is a flowchart of a method for decoding according to an example embodiment of the disclosure. As shown in FIG. 12, the method for decoding in the example embodiment includes the following Step S1201 to Step S1206.

Step S1201: a decoder parses SH, and determines an ID of a subset SPS referred to by a slice.

The decoder reads a bitstream of the SH from a received bitstream, and parses pic_parameter_set_id of a PPS referred to by current slice using an entropy decoding method corresponding to ue(v).

The decoder sets a PPS with its ID value equal to pic_parameter_set_id to be "active". The decoder parses bitstream of the PPS, and parses seq_parameter_set_id of a subset SPS referred to by the PPS using the entropy decoding method corresponding to ue(v).

The decoder sets a value of seq_parameter_set_id to be a value of the ID of the subset SPS referred to by the current slice.

Step S1202: the decoder parses a subset SPS corresponding to the ID, and activates the parameter set.

Step S1203: the decoder judges whether the subset SPS includes DPs or not. If the subset SPS includes DPs, Step S1204 is executed; otherwise, Step S1205 is executed.

Step S1204: the decoder generates a virtual parameter set, and executes Step S1205.

The decoder constructs a virtual DPS according to a DPS syntax element organization structure and method based on the DPs in the activated subset SPS, and sets an ID of the virtual DPS to be 0.

Alternatively, the decoder may construct the virtual DPS according to a preset syntax element organization method based on the DPs in the activated subset SPS, and sets the ID of the virtual DPS to be 0.

The preset syntax element organization method may be any representation method for DP data, such as a representation method for directly listing ZFar, ZNear and camera parameters or a representation method of splitting the ZFar, the ZNear and the camera parameter into integer parts and decimal parts.

Step S1205: the decoder continues parsing the SH. If a slice layer refers to the DPS through the DPS ID, the syntax element dps_id is parsed.

When the decoder determines that DRWP and/or VSP are used in decoding the current slice, the decoder determines to refer to the DPS via the DPS ID in the decoding process.

The decoder parses the dps_id of the DPS referred to by the current slice using the entropy decoding method corresponding to ue(v).

Step S1206: the decoder judges whether the value of dps_id is greater than a maximum allowable value DPS_ID_MAX of the DPS ID in the bitstream or not. If the value of dps_id is greater than DPS_ID_MAX, Step S1207 is executed; otherwise, Step S1209 is executed.

A value of DPS_ID_MAX is positive integer power of 2.

The value of DPS_ID_MAX may be a fixed value, and different values can be set for combinations of different Profiles and different Levels in Profile/Level, or the value of DPS_ID_MAX is coded and transmitted in another parameter set (such as subset SPS).

Step S1207: the encoder converts dps_id into multiple DPS IDs.

The decoder assigns the value of dps_id to a temporary variable tempDpsId.

The decoder converts a numerical value corresponding to tempDpsId into a binary value, reads log 2(DPS_ID_MAX) bits from Least Significant Bit (LSB) to Most Significant Bit (MSB), and employs a decimal numerical value corresponding to these bits as dpsId[0]. Data obtained by removing the log 2(DPS_ID_MAX) bits from tempDpsId is reassigned to tempDpsId.

If a value of tempDpsId is smaller than DPS_ID_MAX, its decimal numerical value is employed as dpsId[1]. On the contrary, if the value of tempDpsId is still greater than DPS_ID_MAX, the above operation is repeated, and the decoder converts the numerical value corresponding to tempDpsId into binary value, reads log 2(DPS_ID_MAX) bits from LSB to MSB, and employs a decimal numerical value corresponding to the bits as dpsId[1]. The decoder reassigns data obtained by removing the log 2(DPS_ID_MAX) bits from tempDpsId to tempDpsId.

The decoder can obtain multiple DPS ID values, i.e. dpsId[0], dpsId[1], . . . , dpsId[n−1], by decomposing dps_id by repeating the above flow, and the data of the corresponding DPS is stored in dpsContent[dpsId[i]], wherein i is 0, 1, . . . , n−1.

Step S1208: the decoder constructs a virtual DPS using multiple DPSs, and sets an ID value of the virtual DPS to be equal to dps_id. Step S1209 is executed.

The decoder constructs the virtual DPS according to the DPS syntax structure using the DPs in the activated subset SPS, and sets the ID of this virtual DPS to be 0.

Alternatively, the decoder may construct the virtual DPS according to the preset syntax structure using the DPs in the activated subset SPS, and sets the ID of the virtual DPS to be 0.

The preset syntax element organization method may be any representation method for DP data, such as a representation method for directly listing ZFar, ZNear and camera parameters or a representation method of splitting the ZFar, the ZNear and the camera parameter into integer parts and decimal parts.

The decoder allocates a storage space dpsContent[dps_id] to the virtual DPS, and initializes the storage space as follows: each data parameter in the DPS does not exist, that is, a flag of each data parameter is set to be 0.

The decoder determines data in the virtual DPS using the pseudo code as follows:

for(i=0;i<n;i++)

mergeDps(dpsContent[dps_id],dpsContent[dpsId[i]]);

wherein mergeDps(dpsA, dpsB) functions as follows: if a value of a flag indicating whether a certain data parameter in dpsA exists or not is 0, the flag for the data parameter and value of the data parameter in dpsA are set to be equal to the counterpart flag and the counterpart data parameter in dpsB.

Step S1209: the decoder sets the DPS or virtual DPS with its ID value equal to dps_id to be "active", and acquires the DPs for the decoding of the current slice from the currently activated DPS or virtual DPS using the conventional data processing method for the activated parameter set in 3D-AVC.

Step S1210: the decoder continues parsing syntax elements in the SH.

Particularly, the following method may be used by the decoder. For Step S1206, the decoder judges whether the value of dps_id is greater than the maximum admissible value DPS_ID_MAX of the DPS ID in the bitstream or not, and if the judgment result is positive and the decoder has generated the virtual parameter set of which the ID value is equal to dps_id before decoding the current slice, the decoder may skip Step S1207 and Step S1208, and directly activate the generated virtual parameter set with its ID value equal to dps_id.

Figure 13:
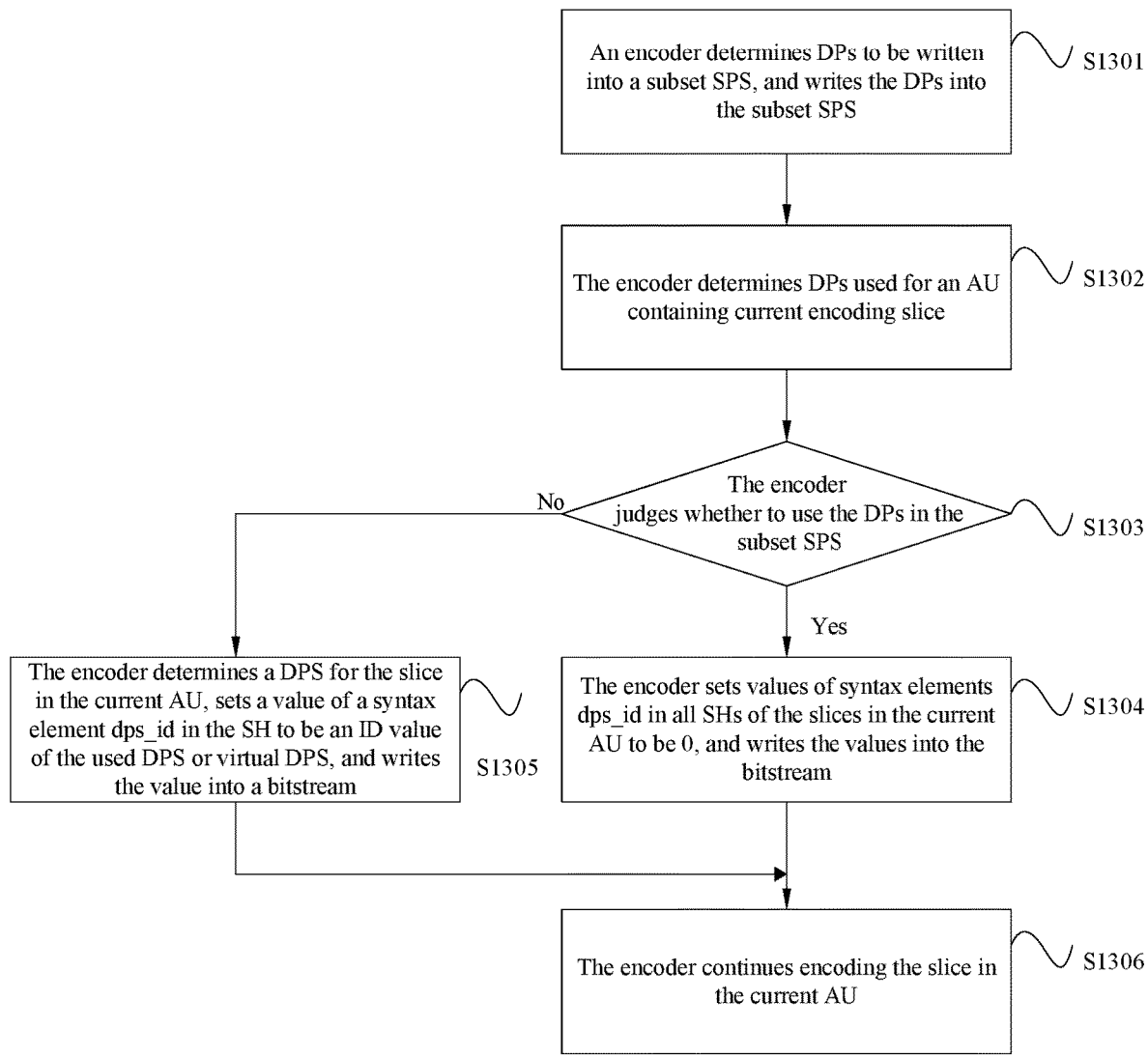
FIG. 13 is a second flowchart of a method for encoding according to an example embodiment of the disclosure.

FIG. 13 is a second flowchart of a method for encoding according to an example embodiment of the disclosure. As shown in FIG. 13, the method for encoding in the embodiment of the disclosure includes the following Step S1301 to Step S1306.

Step S1301: an encoder determines DPs to be written into a subset SPS, and writes the DPs into the subset SPS.

For a non-real time application (such as storage playing), the encoder scans DPs required by the entire sequence, employs the DPs for most frames as the DPs to be written into the subset SPS, and writes the DPs into the subset SPS according to an organization method and entropy coding method for syntax elements related to these DPs in the subset SPS.

For an application tolerant to a certain time delay, the encoder starts scanning from the first frame of a sequence to a specified moment (such as a time delay upper limit), employs DPs for most frames as the DPs to be written into the subset SPS, and writes the DPs into the subset SPS according to the organization method and entropy coding method for the syntax elements related to these DPs in the subset SPS.

For a low delay application (such as a video conference), the encoder directly employs DPs of the first frame of the sequence as the DPs to be written into the subset SPS, and writes the DPs into the subset SPS according to the organization method and entropy coding method for the syntax elements related to these DPs in the subset SPS.

Step S1302: the encoder determines DPs used for an AU where a current encoding slice is located.

The encoder may directly obtain camera parameters at the sampling time instant of the picture containing the current slice in current AU from an external control element.

If depth information is directly acquired from a depth camera, the encoder may acquire parameter values such as ZFar and ZNear at the sampling time instant of the picture containing the current slice in the current AU from a depth information processing element of the depth camera or a depth information processing element of a system.

If the depth information is estimated from 3DV video and information, the encoder can acquire the parameter values such as ZFar and ZNear at the sampling time instant of the picture containing the current slice in the current AU from a 3DV preprocessing element of the system.

The encoder acquires information such as ZFar, ZNear and the camera parameters from system equipment, and employs the information as the DPs for the AU containing the current slice.

Step S1303: the encoder judges whether the DPs for the current AU are the same as the DPs in the subset SPS or not. If the DPs for the current AU are the same as the DPs in the subset SPS, Step S1304 is executed; otherwise, Step S1305 is executed.

Step S1304: the encoder sets values of syntax elements dps_id in all SHs of the slices in the current AU to be 0, and writes the values into a bitstream using an entropy coding method corresponding to ue(v). Step S1306 is executed.

Step S1305: the encoder determines a DPS for the slice in the current AU, sets a value of syntax element dps_id in the SH to be an ID value of the used DPS, and writes the value into the bitstream. Step S1306 is executed.

A determination process for dps_id in Step S1305 may be implemented under three conditions:

Condition 1

If the currently used DPs are the same as the DPs included in a certain coded DPS or virtual DPS, the encoder sets the values of the syntax elements dps_id in all the SHs to be the ID value of the DPS or virtual DPS, and writes the values of dps_id into the bitstream using the entropy coding method corresponding to ue(v).

Condition 2

If each data parameter in the currently used DPs is the same as corresponding data parameters of DPSs and virtual DPSs, of which IDs are smaller than DPS ID MAX, respectively (it is supposed that there are totally n DPSs or virtual DPSs), the IDs of the DPSs and the virtual DPSs are recorded respectively, and are stored in dpsId[0], dpsId[1], dpsId[n−1], and the corresponding data parameters in the DPSs and the virtual DPSs are stored in dpsContent[dpsId [i]], wherein i is 0, 1, . . . , n−1; and the value of DPS_ID_MAX is positive integer power of 2.

The value of DPS_ID_MAX may be a fixed value, and different values may be set for combinations of different Profiles and different Levels in Profile/Level, or the value of DPS_ID_MAX is coded and transmitted in another parameter set (such as subset SPS).

The encoder adjusts the storage order of the IDs of the DPSs and the virtual DPSs in an array dpsId[i] (wherein, i is 0, 1, . . . , n−1) until the data parameters which can be obtained using the following pseudo code in virtualDps are the same as the currently used DPs. In the pseudo code, virtualDps is initialized in a way that each data parameter in the DPS does not exist, that is, a flag corresponding to each data parameter is set to be 0.

```
for(i=0;i<n;i++)
    mergeDps( virtualDps, dpsContent[ dpsId[i] ] );
``` wherein mergeDps(dpsA, dpsB) functions as follows: if a value of a flag indicating whether a certain data parameter in dpsA exists or not is 0, the flag for the data parameter and value of the data parameter in dpsA are set to be equal to the counterpart flag and the counterpart data parameter in dpsB.

The encoder calculates the value of dps_id using the following pseudo code:

```
currDpsId = dpsId[ 0 ];
for ( i = 1; i < n; i++ )
{
   currDpsId = currDpsId << log2(MAX_DPS_ID);
   currDpsId += dpsId[ i ];
}
```

The encoder sets the values of the syntax elements dps_id in all the SHs of the slices in the current AU to be currDpsId, and writes the values into the bitstream using the entropy coding method corresponding to ue(v).

Condition 3

If the currently used DPs are different from DP data in any coded DPS and virtual DPS, or the Condition 2 is met but the encoder considers the method used under the condition 2 is relatively complex (the number of the existing DPSs used in generating the virtual DPS for the current AU is controlled in consideration of error resistance) according to the encoder optimization rules, the encoder generates a new DPS for the currently used DPs, allocates an ID to the DPS, a value of the ID being more than 0 and smaller than MAX_DPS_ID, and assigns the value to the syntax elements dps_id of all the SHs of the slices in the current AU.

The encoder encodes the currently used DPs using the generated DPS, and writes the value of dps_id into the bitstream using the entropy coding method corresponding to ue(v).

Step S1306: the encoder continues encoding the slice included in the current AU.

Example Embodiment 5

The embodiment provides electronic equipment, which is capable of encoding a 3DV signal using the encoder implementation methods in the abovementioned embodiments and output a bitstream.

The electronic equipment can parse the bitstream to obtain DPs used in decoding process to recover the 3DV signal using the methods for decoder implementation in the abovementioned embodiments.

The electronic equipments of the embodiment may be the equipment generating bitstreams and/or the equipment receiving and rendering bitstreams in video communication application, such as a mobile phone, a computer, a server, a set-top box, a portable mobile terminal, a digital camera and television broadcasting system equipments.

According to the embodiments, the methods and devices for encoding and decoding using parameter sets, and the electronic equipment are provided, and data is coded and decoded using the virtual parameter sets, so that the problem of relatively complex flows of methods for encoding and decoding using parameter sets in the related art is solved, and the effect of improving encoding and decoding efficiency is further achieved. It should be noted that the technical effects are not peculiar to all of the abovementioned embodiments, and some technical effects can be achieved by certain example implementation modes.

Obviously, those skilled in the art should know that each component or step of the disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or can form each integrated circuit component, or multiple components or steps therein can form a single integrated circuit component for implementation. As a consequence, the disclosure is not limited to any specific hardware and software combination.

The above is only the example embodiment of the disclosure and not intended to limit the disclosure, and for those skilled in the art, the disclosure may have various modifications and variations. Any modifications, equivalent replacements, improvements and the like within the principle of the disclosure shall fall within the scope of protection defined by the appended claims of the disclosure.

What is claimed is:

1. A method of video bitstream processing, comprising:
   acquiring, by an encoder, information from a bitstream representation of a video;
   generating, by the encoder, based on the information from the bitstream, a virtual parameter set that includes tool parameters and/or control parameters; and
   writing, by the encoder, the virtual parameter set into the bitstream;
   wherein the writing the virtual parameter set is performed for a slice, and wherein the writing is performed by:
   making a judgment, by the encoder, whether the tool parameters and/or the control parameters in the virtual parameter set for the slice are same as tool parameters and/or control parameters of an existing parameter set or an existing virtual parameter set in the bitstream;
   in case that the judgment is positive, using the existing parameter set as the virtual parameter set for the slice; or
   in case that the judgment is negative, writing, by the encoder, use of the virtual parameter set for the slice.

2. The method of claim 1, wherein the writing comprises:
   writing, by the encoder, an ID of the virtual parameter set into a slice header of the bitstream.

3. The method according to claim 1, wherein the tool parameters and/or the control parameters are depth information parameters, and the tool parameters and/or the control parameters comprise at least one of: parameters for a digital presentation of depth information, attribute parameters for camera imaging system and camera arrangement manner related parameters.

4. The method according to claim 1, wherein the virtual parameter set is a data structure having a syntax structure of an existing parameter set.

5. A video encoder apparatus comprising a processor configured to implement a method, comprising:
   acquiring information from a bitstream representation of a video;
   generating, based on the information from the bitstream, a virtual parameter set that includes tool parameters and/or control parameters; and
   writing the virtual parameter set into the bitstream;
   wherein the writing the virtual parameter set is performed for a slice, and wherein the writing is performed by:
   making a judgment, by the encoder, whether the tool parameters and/or the control parameters in the virtual parameter set for the slice are same as tool parameters and/or control parameters of an existing parameter set or an existing virtual parameter set in the bitstream;
   in case that the judgment is positive, using the existing parameter set as the virtual parameter set for the slice; or in case that the judgment is negative, writing, by the encoder, use of the virtual parameter set for the slice.

6. The video encoder apparatus of claim 5, wherein the writing comprises:

writing, by the encoder, an ID of the virtual parameter set into a slice header of the bitstream.

7. The video encoder apparatus according to claim 5, wherein the tool parameters and/or the control parameters are depth information parameters, and the tool parameters and/or the control parameters comprise at least one of: parameters for a digital presentation of depth information, attribute parameters for camera imaging system and camera arrangement manner related parameters.

8. The video encoder apparatus according to claim 5, wherein the virtual parameter set is a data structure having a syntax structure of an existing parameter set.

9. A computer program medium storing a software that, upon execution, causing a video encoder to implement a method of bitstream processing, comprising:

acquiring, by an encoder, information from a bitstream representation of a video;

generating, by the encoder, based on the information from the bitstream, a virtual parameter set that includes tool parameters and/or control parameters; and writing, by the encoder, the virtual parameter set into the bitstream;

wherein the writing the virtual parameter set is performed for a slice, and wherein the writing is performed by:

making a judgment, by the encoder, whether the tool parameters and/or the control parameters in the virtual parameter set for the slice are same as tool parameters and/or control parameters of an existing parameter set or an existing virtual parameter set in the bitstream;

in case that the judgment is positive, using the existing parameter set as the virtual parameter set for the slice; or in case that the judgment is negative, writing, by the encoder, use of the virtual parameter set for the slice.

10. The computer program medium of claim 9, wherein the writing comprises:

writing, by the encoder, an ID of the virtual parameter set into a slice header of the bitstream.

11. The computer program medium according to claim 9, wherein the tool parameters and/or the control parameters are depth information parameters, and the tool parameters and/or the control parameters comprise at least one of: parameters for a digital presentation of depth information, attribute parameters for camera imaging system and camera arrangement manner related parameters.

* * * * *